US009982646B2

United States Patent
Khafagy et al.

(10) Patent No.: US 9,982,646 B2
(45) Date of Patent: May 29, 2018

(54) HEATING ELEMENT OPERATION AND ENGINE START-STOP AVAILABILITY

(71) Applicant: Ford Global Technologies, LLC, Dearborn, MI (US)

(72) Inventors: Hafiz Shafeek Khafagy, Dearborn, MI (US); Kirk Pebley, Novi, MI (US); Gjergji Shaska, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 14/707,103

(22) Filed: May 8, 2015

(65) Prior Publication Data

US 2016/0327006 A1 Nov. 10, 2016

(51) Int. Cl.
*F02N 11/08* (2006.01)
*H05B 3/84* (2006.01)
*H05B 1/02* (2006.01)

(52) U.S. Cl.
CPC ......... *F02N 11/084* (2013.01); *H05B 1/0236* (2013.01); *H05B 3/84* (2013.01); *F02N 2200/061* (2013.01); *F02N 2200/0809* (2013.01); *F02N 2200/0811* (2013.01); *Y02T 10/48* (2013.01)

(58) Field of Classification Search
CPC .... Y02T 10/48; F02D 41/042; F02N 11/0814; F02N 11/0844; F02N 11/0818; F02N 11/0825; F02N 11/0822; F02N 11/0833; F02N 11/0829; F02M 26/43
See application file for complete search history.

(56) References Cited

U.S. PATENT DOCUMENTS

| 6,476,358 | B1 | 11/2002 | Lang et al. | |
|---|---|---|---|---|
| 9,248,824 | B2 * | 2/2016 | Rademacher | B60W 10/06 |
| 9,422,861 | B2 * | 8/2016 | Miyagawa | F02B 77/11 |
| 2004/0206739 | A1 | 10/2004 | Duance | |
| 2005/0193747 | A1 * | 9/2005 | Kajimoto | B60H 1/00778 62/133 |
| 2012/0215430 | A1 * | 8/2012 | Watanabe | B60H 1/00778 701/113 |
| 2012/0259534 | A1 | 10/2012 | Wakou et al. | |
| 2013/0168458 | A1 * | 7/2013 | Ichishi | B60H 1/004 237/2 A |
| 2013/0245925 | A1 * | 9/2013 | Malone | F02N 11/0818 701/113 |
| 2014/0032086 | A1 | 1/2014 | Wijaya et al. | |
| 2014/0081561 | A1 * | 3/2014 | Be | B60W 50/085 701/112 |

(Continued)

*Primary Examiner* — Sizo Vilakazi
(74) *Attorney, Agent, or Firm* — David Kelley; Brooks Kushman P.C.

(57) ABSTRACT

A vehicle includes a rear visibility component having a heating element. The vehicle further includes an engine and at least one controller programmed to auto-start and auto-stop the engine. The at least one controller is programmed to inhibit the auto-stop of the engine in response to receiving an auto-stop request while the engine is on and the heating element has been operating less than a predetermined time. In some configurations, the at least one controller is programmed to auto-start the engine and operate the heating element at a full power level in response to expiration of a time period that began with an auto-stop of the engine that occurred after the engine auto-stop was inhibited.

19 Claims, 2 Drawing Sheets

(56) References Cited

U.S. PATENT DOCUMENTS

2014/0200763 A1 7/2014 Sisk
2014/0278019 A1* 9/2014 Be .......................... F02D 29/02
　　　　　　　　　　　　　　　　　　　　701/112

* cited by examiner

HEATING ELEMENT OPERATION AND ENGINE START-STOP AVAILABILITY

TECHNICAL FIELD

This application generally relates to integration of a heated back light and heated side mirrors in a vehicle.

BACKGROUND

A vehicle can be configured to auto-stop and auto-start an engine. The engine start/stop criteria are generally selected to improve fuel economy. The vehicle may include a heated backlite and heated side mirrors. These heated components may draw significant amounts of current when activated. The typical operating strategy for the vehicle is to force the engine to a running state when these heated components are activated.

SUMMARY

A vehicle includes a heating element coupled to a rear visibility component and an engine. The vehicle further includes at least one controller programmed to auto-start and auto-stop the engine and, in response to an auto-stop request received while the engine is on and the heating element has been operating less than a predetermined time, inhibit auto-stop of the engine such that the engine remains on.

The at least one controller may be further programmed to, in response to expiration of the predetermined time, reduce a power level of the heating element and auto-stop the engine. The at least one controller may be further programmed to, in response to expiration of a time period that began with the auto-stop of the engine, auto-start the engine and increase the power level of the heating element.

The vehicle may further include an indicator that provides an activation status of the heating element. The at least one controller may be further programmed to, in response to a request to activate the heating element when the engine is auto-stopped, inhibit activation of the heating element and activate the indicator.

The at least one controller may be further programmed to, in response to the request to activate the heating element being present for a duration greater than a predetermined duration while the engine is auto-stopped, auto-start the engine and activate the heating element.

A vehicle includes a heating element coupled to a rear visibility component and an engine. The vehicle further includes at least one controller programmed to auto-start and auto-stop the engine and, in response to expiration of a time period that began with an auto-stop of the engine associated with a reduction of power to the heating element, auto-start the engine and increase the power to the heating element.

The at least one controller may be further programmed to, in response to an auto-stop request received while the engine is on and the heating element has been operating at a full power level for less than a predetermined time, inhibit the auto-stop of the engine such that the engine remains on.

A method includes inhibiting, by a controller, an auto-stop request for an engine received while the engine is on and a heating element for a rear visibility component has been operating at a full power level for less than a predetermined time. The method further includes outputting, by the controller, the auto-stop request in response to expiration of the predetermined time. The method may further include operating, by the controller, the heating element at a reduced power level in response to the engine auto-stopping.

The method may further include outputting, by the controller, an auto-start request for the engine in response to an engine auto-stop duration being greater than a predetermined engine-off time. The method may further include operating, by the controller, the heating element at a full power level in response to the engine auto-starting.

The method may further include activating, by the controller, an indicator in response to a request to activate the heating element during an engine auto-stop period; and inhibiting, by the controller, activation of the heating element during the engine auto-stop period. The method may further include operating, by the controller, the heating element at a full power level in response to inhibiting activation of the heating element for a predetermined duration.

The rear visibility component may be a backlite of the vehicle. The rear visibility component may be a side mirror of the vehicle.

The vehicle may further include a sensor outputting a signal indicative of an ambient temperature and the predetermined time may be based on the ambient temperature. The predetermined time may decrease as the ambient temperature increases.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
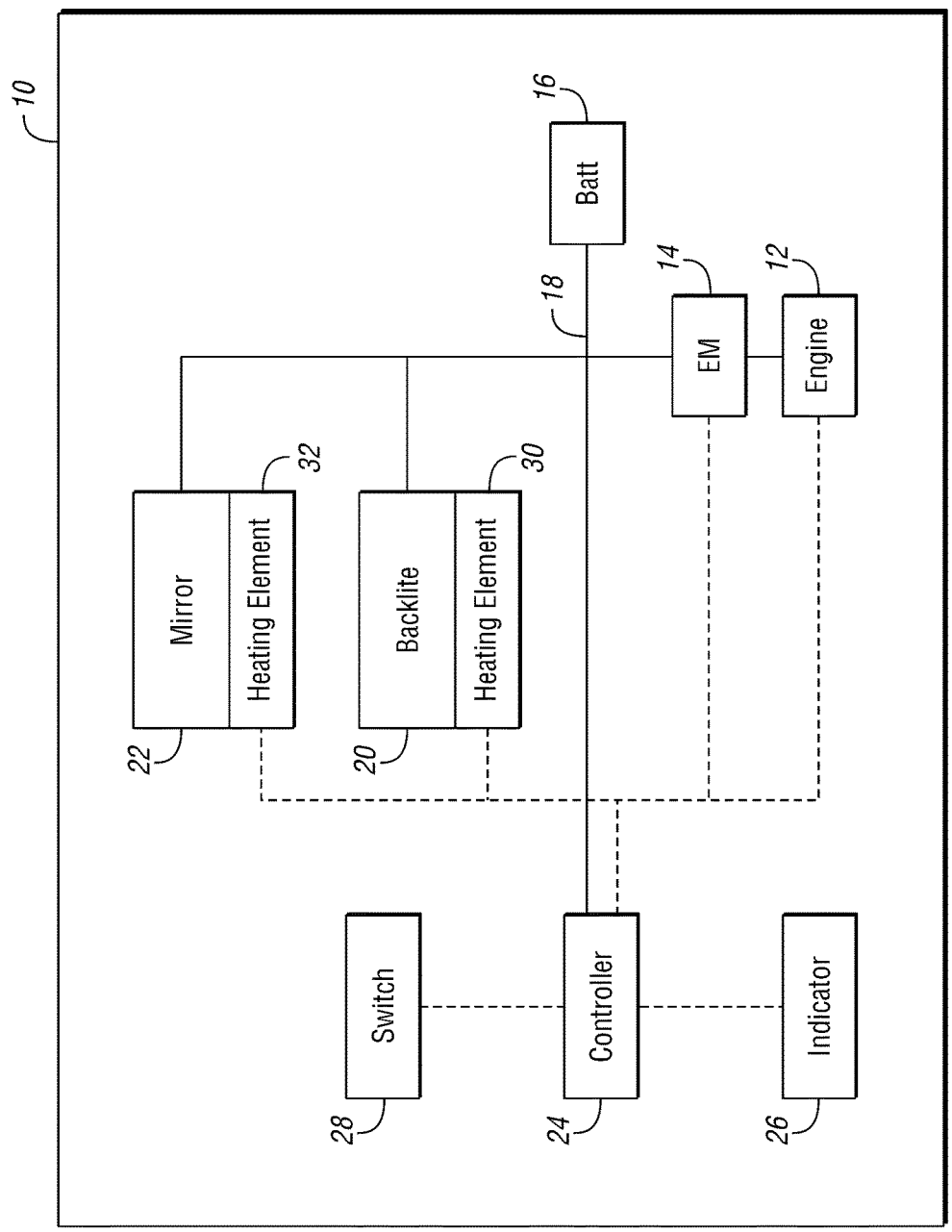
FIG. 1 is a possible vehicle configuration including a heated backlite and a heated side mirror.

FIG. 1 depicts an exemplary block diagram of a vehicle 10. The vehicle may be a hybrid-electric vehicle. The vehicle 10 may include an engine 12 for powering the vehicle 10. The engine 12 may be mechanically coupled to an electric machine 14. The electric machine 14 may function as an alternator and a starter. When operating as a starter, the electric machine 14 may receive electrical power from a battery 16 over a power network 18. The electric machine 14 may convert the electrical power into mechanical rotation to start the engine 12.

When operating as an alternator or generator, the electric machine 14 may convert mechanical energy from rotation of the engine 12 into electrical energy on the power network

18. The electrical energy may be stored in the battery 16 or utilized by electrical components coupled to the power network 18. The power network 18 may include power and ground signals.

At least one controller 24 may be configured to auto-stop and auto-start the engine 12. The controller 24 may monitor conditions for starting and stopping of the engine 12 during an ignition cycle. Conditions may include determining when to auto-stop the engine 12 to improve fuel economy. For example, during a brake application the engine 12 may be auto-stopped. Other conditions may include determining when to auto-start the engine 12. For example, when an operator releases the brake pedal, the engine 12 may be auto-started. In some configurations, the controller 24 may coordinate the operation of multiple controllers to perform auto-stop and auto-start of the engine 12. For example, an engine controller may communicate with the controller 24 via a communications network (e.g., Controller Area Network (CAN)).

The controller 24 may be configured to operate the electric machine 14. In some configurations, the vehicle may include a power electronics module to interface with the electric machine 14. The power electronics module may include switching circuits to electrically couple windings of the electric machine 14 to the power network 18. The controller 24 may be configured to interface with the power electronics module to control the electric machine 14.

The vehicle 10 may include rear visibility components (e.g., 20, 22) that are configured to permit the operator to view areas to the rear of the vehicle 10. The rear visibility components may include a backlite 20 (rear window) and one or more side mirrors 22. The backlite 20 may be coupled to an associated heating element 30 such that the backlite 20 may be referred to as a heated backlite. The side mirrors 22 may be coupled to an associated heating element 32 such that the side mirrors 22 may be referred to as heated side mirrors.

The heating elements 30, 32 may be configured to heat a surface of the rear visibility component to clear fog and melt ice and snow that may have accumulated on the rear visibility component. The heated backlite 20 and heated side mirrors 22 may be beneficial for cold weather conditions to improve visibility toward the rear of the vehicle 10.

The heating elements 30, 32 may be electrically coupled to the power network 18 and draw electrical power to operate. The heating elements 30, 32 may be a resistive heating device that generates heat when current passes through. When the engine 12 is running, the electrical power may be generated by the electric machine 14. When the engine 12 is stopped, the electrical power may be provided by the battery 16. In some situations, it may not be desirable to draw power from the battery 16 when the engine 12 is stopped. For example, a relatively long engine auto-stop cycle could allow the energy stored in the battery 16 to fall below a threshold at which the engine 12 cannot be restarted. The power supplied to the heating elements 30, 32 may be controlled by the controller 24. For example, the voltage and/or current applied to the heating elements 30, 32 may be controlled. The heating elements 30, 32 may have a full power level defined by a nominal or rated power level. The heating elements 30, 32 may operate at reduced power levels that are defined by power levels from zero to less than the full power level. The controller 24 may include one or more switching devices to connect the heating element 30, 32 to power or ground.

The vehicle 10 may further include an indicator 26 to display the status of the heating elements 30, 32 to the operator. The indicator 26 may be a lamp located in a dashboard. The indicator 26 may be a symbol in a heads-up display. The indicator 26 may be lamp located on the switch or button that activates the associated heating element 30, 32.

The heating elements 30, 32 may be manually activated by the operator. For example, the heated backlite 20 may have an associated switch or button 28 for activating the feature. The heated backlite 20 may be activated based on activation of other related features. For example, a maximum defrost feature may include a button or switch to activate a maximum defrost mode. The maximum defrost mode may activate various defrosting features such as the heated backlite 20, the heated mirrors 22 and a front windshield defroster.

The heating elements 30, 32 may be automatically activated under certain conditions. For example, the heating elements 30, 32 may be activated when an ambient temperature is below a predetermined temperature. The duration of the heating element activation may be based on the ambient temperature. The duration of the heating element activation may decrease as the ambient temperature increases.

While the engine 12 is running, the heating elements 30, 32 may be configured to remain activated at the full power level for a predetermined completion time. The predetermined completion time may be based on the ambient temperature. The predetermined completion time may increase as the ambient temperature decreases. The predetermined completion time may be interrupted when the operator manually deactivates the heating elements 30, 32 using the switch or button 28. After the predetermined completion time, the heating elements 30, 32 may be deactivated.

In a conventional vehicle, the heating elements 30, 32 may be activated at the full power level when requested by the operator as the engine is always running. In a vehicle 10 that includes auto-stop/auto-start capability of the engine 12, operation of the heating elements 30, 32 may be modified to improve fuel economy. To improve fuel economy in a hybrid vehicle 10, it may be beneficial to increase the number of engine auto-stop cycles. The power loading of the battery 16 may be one factor considered for permitting an auto-stop cycle. Situations in which the power loading of the battery 16 is above a threshold may inhibit an engine auto-stop cycle. As the heating elements 30, 32 increase the power loading of the battery 16, fewer engine auto-stop opportunities may be available when the heating elements 30, 32 are activated.

Activation of the heating elements 30, 32 at full power may be interrupted when an engine auto-stop request is present. The controller 24 may be configured to ensure that the heating elements 30, 32 are operated at the full power level for a predetermined minimum activation time. In response to an auto-stop request being received while the engine is on and the heating element 30, 32 has been operating for less than the predetermined minimum activation time, engine auto-stops may be inhibited such that the engine remains on. Once the predetermined minimum activation time has expired, the heating element 30, 32 may be operated at the reduced power level and the engine may be auto-stopped.

During the engine auto-stop, the power to the heating elements 30, 32 may be reduced. In some configurations, the heating elements 30, 32 may be deactivated during the engine auto-stop such that the power level is reduced to zero. A time that the heating element 30, 32 is activated at full power may be monitored by the controller 24. Engine auto-stops may be inhibited when the activation time is less than the predetermined minimum activation time. This ensures that the heating element 30, 32 is activated at full power for a certain amount of time before reducing the power. When the activation time exceeds the predetermined minimum activation time, the engine auto-stop may be performed and the heating element 30, 32 may be operated at a reduced power level. The predetermined minimum activation time may be based on the ambient temperature. The predetermined minimum activation time may decrease as the ambient temperature increases.

The reduced power level may be a configurable option. In some configurations, the controller 24 may determine the reduced power level that permits the engine auto-stop request. The reduced power level may be a power level that ensures that the battery 16 has enough remaining energy to start the engine 12. The reduced power level may be based on a state of charge of the battery 16.

During an engine auto-stop of the engine, requests to activate the heating element 30, 32 may be delayed until the engine 12 is auto-started. When the activation of the heating element 30, 32 is delayed, the indicator 26 may be activated to provide feedback to the operator that the request was received. The system may be configured to permit a predetermined maximum delay time. When the predetermined maximum delay time is exceeded, an engine auto-start request may be issued to restart the engine. For example, the predetermined maximum delay time may be thirty seconds. When the engine 12 is restarted, the heating element 30, 32 may be activated such that power to the heating element 30, 32 is increased. The heating element 30, 32 may be activated at full power. The delayed activation feature prevents the heating element 30, 32 from activating and immediately forcing engine restarts which may improve fuel economy.

The predetermined minimum activation time for inhibiting engine auto-stops may be less than the predetermined completion time that is based on the ambient temperature. The predetermined minimum activation time may also be based on the ambient temperature. The predetermined minimum activation time may be a predetermined percentage of the predetermined completion time. When the heating element 30, 32 is activated at the full power level for less than the predetermined completion time, the engine auto-stop duration may be limited to a predetermined auto-stop duration. In response to expiration of a time period that began with the auto-stop of the engine, the engine may be auto-started and the power level to the heating element 30, 32 may be increased to the full power level. For example, the system may be configured to limit the auto-stop duration to two minutes when the predetermined completion time has not been achieved prior to the engine auto-stop. When the predetermined auto-stop duration is exceeded, an engine auto-start request may be issued to restart the engine. Upon engine restart, the heating element 30, 32 may be increased to the full power level for the remainder of the predetermined completion time.

In configurations in which the heating elements 30, 32 are operated at reduced power levels during the engine auto-stop, the remaining activation time at the full power level after restarting the engine may be adjusted. The remaining activation time may be reduced based on the reduced power level and the amount of time of the auto-stop event. A total amount of power delivered to the heating element 30, 32 over time may be computed. The remaining activation time may be adjusted such that the total amount of power delivered over time is consistent between auto-stop event and activations not interrupted by an auto-stop event.

Figure 2:
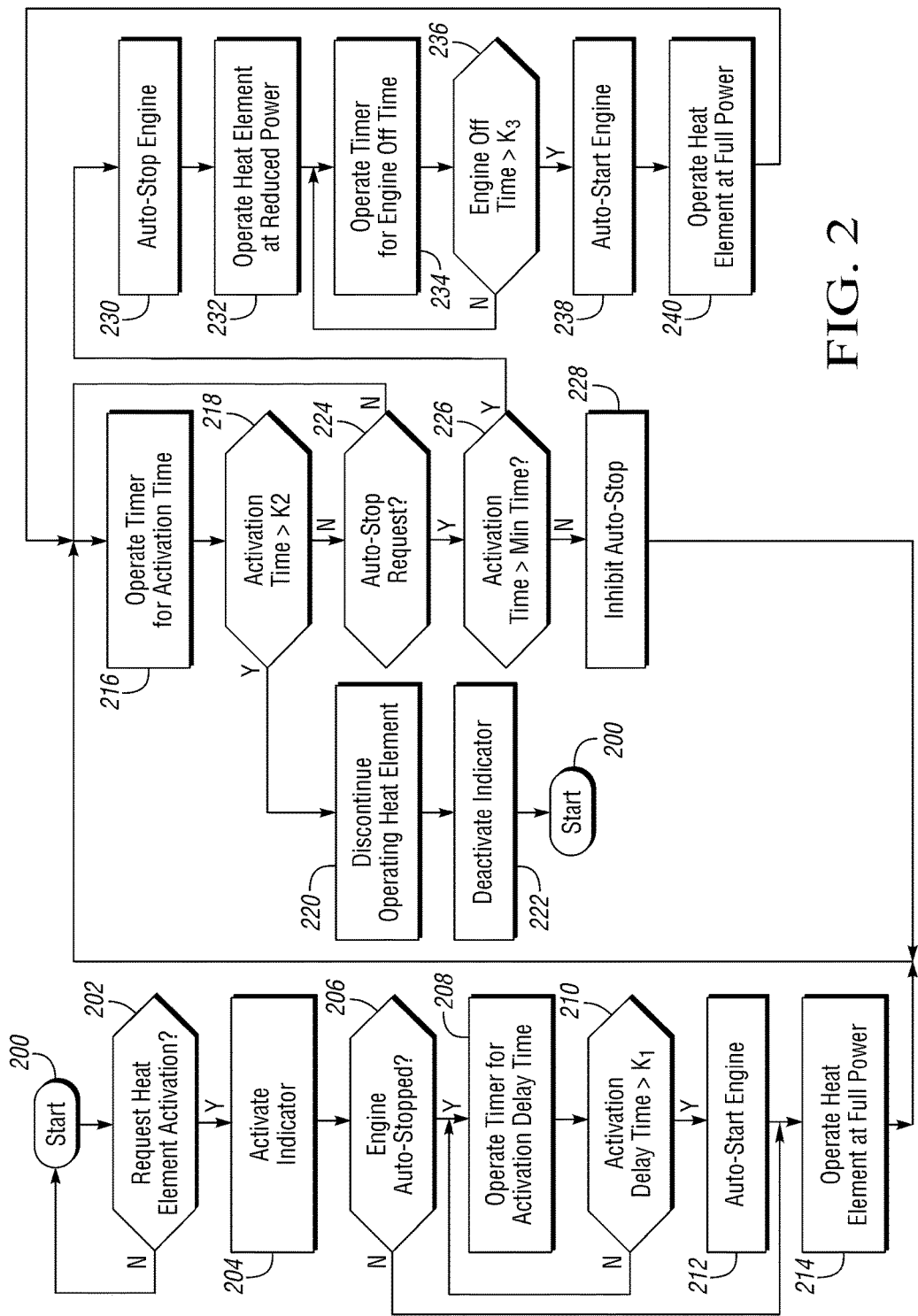
FIG. 2 is a possible flowchart for controlling activation of heating elements for rear visibility components in a vehicle with engine auto-stop/auto-start capability.

FIG. 2 depicts a flow chart for one possible implementation of a system for operating heating elements for a heated backlite and/or heated side mirrors in an auto-stop/auto-start vehicle. Execution may begin at a starting point 200 that may be entered upon power-up or when the heating elements 30, 32 are not requested to be on. At decision block 202, a request for activation of the heating element may be monitored. If no heating element activation requests are present, the logic may continue to monitor for a request. If heating element activation is requested, operation 204 may be performed. At operation 204, the indicator 26 may be activated. At operation 206, the engine running state may be monitored. If the engine is running, execution may pass to operation 214. If the engine is auto-stopped (e.g., not running), then operation 208 may be performed. Operation 208 operates a timer for an activation delay time. At operation 210, the activation delay time is compared to a threshold ($K_1$). If the activation delay time is less than or equal to the threshold ($K_1$), execution passes back to operation 208 to continue operating the activation delay time timer. If the activation delay time is greater than the threshold ($K_1$) then operation 212 is performed to auto-start the engine.

At operation 214, the heating element 30, 32 may be activated and operated at the full power level. At operation 216, a timer may be operated corresponding to an activation time of the heating element 30, 32. At operation 218, the activation time may be compared to a threshold ($K_2$). The threshold ($K_2$) may correspond to the predetermined completion time for the heating element 30, 32. If the activation time is greater than the threshold ($K_2$), then operation 220 may be performed. At operation 220, operation of the heating element 30, 32 may be discontinued. At operation 222, the indicator may be deactivated. Operation may then return to the starting point 200 to await another heating request. If the activation time is less than or equal to the threshold ($K_2$), then operation 224 may be performed.

At operation 224, signals are monitored for an auto-stop request. If an auto-stop request is not detected, execution may return to operation 216 to continue operating the activation timer. If an auto-stop request is detected, operation 226 may be performed. At operation 226, the activation time is compared to a minimum time. If the activation time is less than or equal to the minimum time, then operation 228 may be performed. At operation 228, auto-stop of the engine is inhibited. Operation may then repeat at operation 216 to continue operating and monitoring the activation timers. If the activation time is greater than the minimum time, then operation 230 may be performed.

At operation 230, the engine may be auto-stopped. At operation 232, the heating element 30, 32 may be operated at the reduced power level. At operation 234, a timer may be operated corresponding to an engine-off time. At operation 236, the engine-off time may be compared to a threshold ($K_3$). If the engine-off time is less than or equal to the threshold ($K_3$), then operation may return to operation 234 to continue operating the engine-off timer. If the engine-off time is greater than the threshold ($K_3$), then operation 238 may be performed.

At operation 238, the engine may be auto-started. At operation 240, the power to the heating element 30, 32 may be increased to the full power level. Execution may return to operation 216 to operate the activation timer.

The operations described may be programmed in the controller 24. The controller 24 may include volatile and non-volatile memory to store the program and perform the various operations. The controller 24 may output signals for other controllers and may receive signals from the other controllers. For example, the controller 24 may output an auto-stop inhibit signal and the controller 24 may receive auto-start and auto-stop request signals. The controller 24 may include timers and clock circuits for implementing timers and counters. In the above description, operating the timers may include resetting the timer values to starting values and incrementing/decrementing at periodic intervals. The operations may be executed at a periodic interval.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a heating element coupled to a rear visibility component;
    an engine; and
    a controller programmed to auto-start and auto-stop the engine and, while the engine is on and the heating element is activated, responsive to receiving an auto-stop received while the heating element has been activated less than a predetermined time, inhibit auto-stop of the engine and, upon expiration of the predetermined time, continue activating the heating element and auto-stop the engine.

2. The vehicle of claim 1 wherein the controller is further programmed to, in response to expiration of the predetermined time, reduce a power level of the heating element.

3. The vehicle of claim 2 wherein the controller is further programmed to, in response to expiration of a time period that began with auto-stop of the engine, auto-start the engine and increase the power level of the heating element.

4. The vehicle of claim 1 wherein the rear visibility component is a backlite of the vehicle.

5. The vehicle of claim 1 wherein the rear visibility component is a side mirror of the vehicle.

6. The vehicle of claim 1 further comprising an indicator that provides an activation status of the heating element, wherein the controller is further programmed to, in response to a request to activate the heating element when the engine is auto-stopped, inhibit activation of the heating element and activate the indicator.

7. The vehicle of claim 6 wherein the controller is further programmed to, in response to the request to activate the heating element being present for a duration greater than a predetermined duration while the engine is auto-stopped, auto-start the engine and activate the heating element.

8. The vehicle of claim 1 further comprising a sensor outputting a signal indicative of an ambient temperature, wherein the predetermined time is based on the ambient temperature.

9. The vehicle of claim 8 wherein the predetermined time decreases as the ambient temperature increases.

10. A vehicle comprising:
    a heating element coupled to a rear visibility component;
    an indicator for heating element activation status;
    an engine; and
    a controller programmed to auto-start and auto-stop the engine and, responsive to a request to activate the heating element while the engine is auto-stopped, inhibit activation of the heating element and activate the indicator and, responsive to expiration of a predetermined time from the request, auto-start the engine and activate the heating element.

11. The vehicle of claim 10 wherein the controller is further programmed to, in response to an auto-stop request received while the engine is on and the heating element has been operating at a full power level for less than a second predetermined time, inhibit the auto-stop of the engine such that the engine remains on.

12. The vehicle of claim 11 wherein the second predetermined time is based on an ambient temperature.

13. The vehicle of claim 10 wherein the rear visibility component is a backlite or a side mirror.

14. A method comprising:
    inhibiting, by a controller, an auto-stop request for an engine received while the engine is on and a heating element for a rear visibility component is activated and has been operating at a full power level for less than a predetermined time; and
    outputting, by the controller, the auto-stop request in response to expiration of the predetermined time while the heating element remains activated.

15. The method of claim 14 wherein the predetermined time is based on an ambient temperature.

16. The method of claim 14 further comprising operating, by the controller, the heating element at a reduced power level in response to the engine auto-stopping.

17. The method of claim 14 further comprising
    outputting, by the controller, an auto-start request for the engine in response to an engine auto-stop duration being greater than a predetermined engine-off time; and
    operating, by the controller, the heating element at the full power level in response to the engine auto-starting.

18. The method of claim 14 further comprising
activating, by the controller, an indicator in response to a
   request to activate the heating element during an engine
   auto-stop period; and
inhibiting, by the controller, activation of the heating
   element during the engine auto-stop period.
19. The method of claim 18 further comprising
operating, by the controller, the heating element at the full
   power level in response to inhibiting activation of the
   heating element for a predetermined duration.

\* \* \* \* \*